United States Patent [19]

Asao

[11] 4,389,455

[45] Jun. 21, 1983

[54] PHOTOGRAPHIC RESIN COATED PAPER

[75] Inventor: Yasuzi Asao, Shizuoka, Japan

[73] Assignee: Fuji Photo Film Co., Ltd., Kanatawa, Japan

[21] Appl. No.: 294,867

[22] Filed: Aug. 21, 1981

[51] Int. Cl.³ ........................ B32B 5/16; B32B 27/10; B32B 27/20

[52] U.S. Cl. .................................... 428/328; 428/332; 428/334; 428/335; 428/336; 428/403; 428/513; 430/271; 430/528; 430/538

[58] Field of Search ............... 428/328, 511, 513, 332, 428/334, 335, 336, 403; 430/538, 271, 528

[56] References Cited

U.S. PATENT DOCUMENTS

| | | | |
|---|---|---|---|
| 4,145,480 | 3/1979 | Kusama et al. | 428/513 |
| 4,188,220 | 2/1980 | Kasugai et al. | 428/513 X |

*Primary Examiner*—Thomas J. Herbert, Jr.
*Attorney, Agent, or Firm*—Sughrue, Mion, Zinn, Macpeak and Seas

[57] ABSTRACT

A photographic resin coated paper having improved resolving power of print images is disclosed. The paper is comprised of a base paper sheet having coated thereon polyolefin resin containing particles of titanium oxide pigment. The surface of the pigment particles are coated with a polyhydric alcohol containing from 2 to 4 hydroxyl groups. The polyolefin resin is coated on the paper by extrusion coating.

9 Claims, 3 Drawing Figures

PHOTOGRAPHIC RESIN COATED PAPER

FIELD OF THE INVENTION

The present invention relates to photographic resin coated paper. More specifically, it relates to resin coated paper used for photographic printing paper which has a high resolving power of print images.

BACKGROUND OF THE INVENTION

There has recently been rapid development in the area of photographic printing paper, and polyolefin resin coated paper has been used as a base for the photographic printing paper instead of barita paper having a barium sulfate layer on a paper base. Polyolefin resin coated paper generally contains a titanium oxide pigment in a polyolefin resin of the photographic emulsion side for the purpose of giving high whiteness and hiding power.

Examples of titanium oxide pigments used for this purpose including titanium oxide pigments wherein the surface of particles is not coated as well as titanium oxide pigments wherein the surface of particles is coated with an inorganic substance such as silica or aluminum, etc. are well known. When a polyolefin resin coated paper containing such a titanium oxide pigment is used as a base for photographic printing paper, the resulting product is not satisfactory in that it has a low resolving power of print images. Further, it has been generally well known to add a surface active agent in the form of a metal soap such as calcium stearate or zinc palmitate in order to improve dispersibility of the titanium oxide pigment when the titanium oxide is added to the polyolefin resin. However, when using the polyolefin resin coated paper obtained by this method as a base for photographic printing paper, the level of the resolving power of print images is unsatisfactory, even though it is somewhat improved as compared with that wherein the surface active agent was not added.

SUMMARY OF THE INVENTION

An object of the present invention is to provide resin coated paper for photographic printing paper which has a high resolving power of print images.

As a result of many studies for the purpose of attaining the above described object, the present inventors have found that the resolving power of print images becomes remarkably high, if the coated paper used as a base for photographic printing paper is prepared by extrusion coating of a polyolefin resin containing a titanium oxide pigment wherein the surface of particles is coated with di-, tri- or tetrahydric alcohol.

Figure 1:
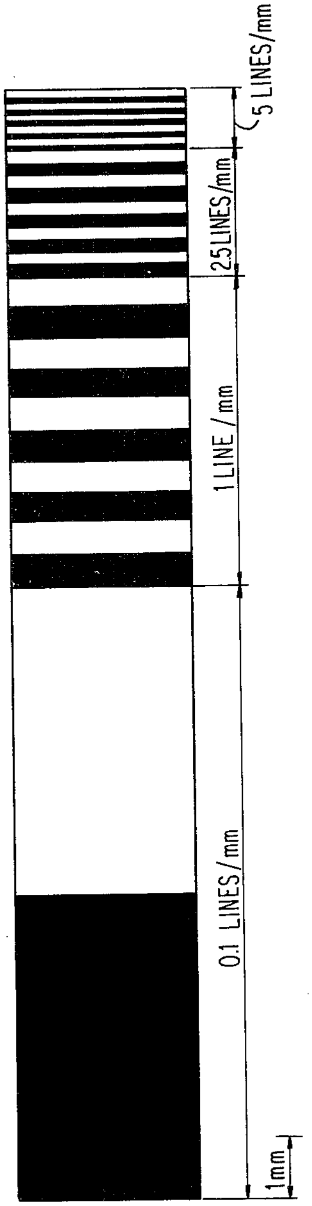
FIGS. 1, 2 and 3 show a minute line chart (×10) for measuring a resolving power, a minute line print image (×10) and an optical density measured by a microphotometer, respectively.

The resolving power is shown as a value obtained by the formula $(D_1/D_0)\times 100$ (%).

DETAILED DESCRIPTION OF THE INVENTION

Examples of di-, tri- and tetrahydric alcohols which can be used in the present invention, include those which have two hydroxyl groups in the molecule such as ethylene glycol, propylene glycol, 1,3-dihydroxybutane, 1,4-dihydroxybutane, pentamethylene glycol, 2,5-dihydroxyhexane, 2,4-dihydroxy-2-methylpentane, heptamethylene glycol or dodecamethylene glycol, those which have three hydroxyl groups in the molecule such as trimethylolethane, trimethylolpropane, glycerine, 2,4-dihydroxy-3-hydroxymethylpentane, 1,2,6-hexanetriol or 2,2-bis-(hydroxymethyl)-3-butanol, and those which have four hydroxyl groups in the molecule such as pentaerythritol.

When only a single hydroxyl group is present in a molecule or when 5 or more hydroxyl groups are present in the molecule, the resolving power of print images of the resulting photographic printing paper is not improved.

It is believed that the resolving power of print images is improved when using the photographic resin coated paper of the present invention for printing paper because the dispersibility of the titanium oxide pigment in the polyolefin resin is improved which increases the hiding power of the polyolefin layer.

It has been found that the photographic resin coated paper of the present invention is very suitable for producing printing paper in that it causes less fogging in addition to having the above described effect.

The preferred amount of the polyhydric alcohol in the coating is in the range of about 0.01 to 10% by weight. A more preferred amount is in the range of 0.1 to 1.5% by weight. If the coating contains less than 0.01% by weight of the polyhydric alcohol, the resolving power of print images on the photographic printing paper is hardly improved. Although the resolving power can be improved with increases in the amount of the coating, an amount of more than 10% by weight is not suitable because the working environment deteriorates by an increase in the generation of smoke or an offensive smell during the extrusion operation.

Examples of polyhydric alcohols used in the present invention include those having 2 to 18 carbon atoms in the molecule. Polyhydric alcohols having 2 to 4 methylol groups and 2 to 6 carbon atoms in a molecule are preferably used, and those having three methylol groups and 4 to 5 carbon atoms in the molecule are more preferably used. When using a titanium oxide pigment wherein the surface of particles was coated with trimethylolethane, the photographic printing paper has the most improved resolving power of print images.

The preferred amount of the polyhydric alcohol in the coating of this case is particularly preferred to be in a range of 0.1 to 1.5% by weight considering maintenance of a desirable working environment in addition to the improvement of the resolving power.

In order to apply the polyhydric alcohol to the surface of particles of the titanium oxide pigment, it is preferable to use a process which comprises dipping titanium oxide in a solution of polyhydric alcohol, evaporating the solvent and drying. Another preferred process comprises spraying a solution of polyhydric alcohol in a solvent on titanium oxide, removing the solvent and drying, and still another preferred process comprises mixing titanium oxide with polyhydric alcohol with fusing into liquid. Among these processes, it is particularly preferred to use the process which comprises mixing titanium oxide with polyhydric alcohol and powdering. For example, the polyhydric alcohol is added to titanium oxide when it is powdered by a fluid energy crusher such as a micronizer or jet mill. Further, a process which comprises uniformly blending by means of a high shear mixer such as a Henschel mixer or a super mixer, may be used.

Any titanium oxide, having an anatase structure or a rutile structure may be used in the present invention. It is also possible to use titanium oxide wherein the surface of particles is not coated and particles whose surface is coated with an inorganic substance such as silica or alumina. It is preferable to use titanium oxide having a heat loss of 0.8% by weight or less when heated at 300° C. for 3 hours. If the heat loss is more than 0.8%, the resolving power deteriorates. The titanium oxide pigment is preferably in an amount in the range of 1 to 40% by weight, more preferably, 5 to 20% by weight, based on the polyolefin resin.

A masterbatch of titanium oxide pigment is produced having the surface of particles coated with polyhydric alcohol. The masterbatch is used by diluting it with a polyolefin resin prior to extrusion. The titanium oxide pigment to the polyolefin resin in the masterbatch is preferred in the range of about 20 to 60% by weight and, more preferably 10 to 40% by weight. The masterbatch may be produced by any process, but is most preferable to use a fusion mixing process by means of, for example, an extruder for blending, a heat kneading roll, a Gumbury's mixer or a kneader.

Useful examples of the polyolefin resin of the present invention include low density polyethylene, high density polyethylene, polypropylene and blends of them. In the above polyolefin resins, the low density polyethylene is preferred.

The thickness of the coating layer is about 5 to 200μ or so, more preferably 10 to 40μ. The resins may be used with known fluorescent whitening agents, antioxidants, antistatic agents and releasing agents.

Examples of paper used in the present invention include those compared of natural pulp, synthetic pulp or mixtures. The paper has a thickness of about 20 to 400μ or so and, preferably, a thickness of 70 to 250μ. The paper has a basis weight of about 15 to 350 g/m$^2$ or so and, preferably, a basis weight of 50 to 200 g/m$^2$.

The paper may combined with a number of known additives, including strengthening agents, sizing agents, coloring agents and fluorescent whitening agents.

In the present invention, extrusion coating means a process which comprises coating a running paper base with polyolefin which is extruded in film from an extruder through a die with fusing. The fusing temperature of polyolefin in the die is about 250° to 350° C. and, preferably, 280° to 320° C. The running speed of the paper base is about 50 to about 500 m/minute and preferably 80 to 250 m/minute.

In order to further explain the effect of the present invention, examples are shown in the following.

A method of measuring the resolving power in the example is as follows.

Figure 2:
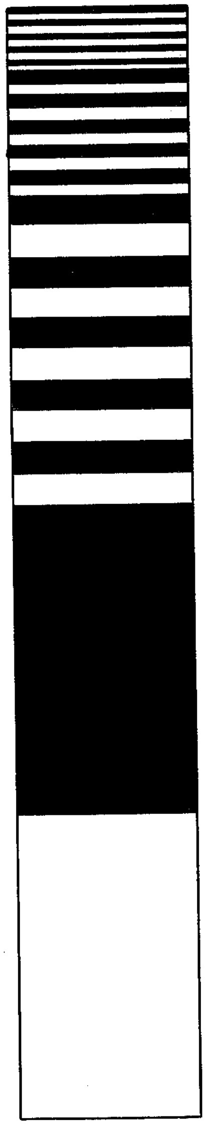
Figure 3:
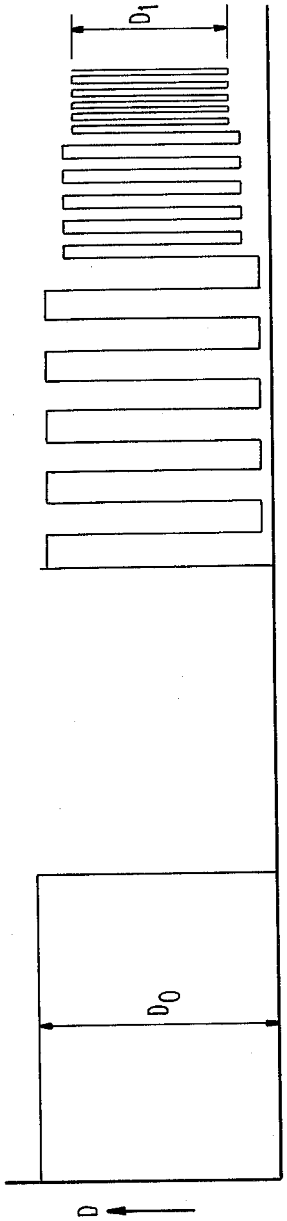

After a photographic emulsion was applied to a polyolefin resin coated paper, a minute line chart (FIG. 1) for measuring a resolving power was printed out thereon. The optical density difference of the minute line print image (FIG. 2) was measured by a microphotometer produced by Union Kogaku Co., and the resolving power was shown as a value obtained by the following formula. This value is in accordance with the result observed by the naked eye. The larger the value is, the higher the resolving power is.

$$\text{Resolving power (\%)} = \frac{\begin{array}{c}\text{Optical density difference of}\\ \text{a minute line print image of}\\ \text{5 lines/mm between the exposed}\\ \text{part and the non-exposed part}\end{array}}{\begin{array}{c}\text{Optical density difference of}\\ \text{a minute line print image of}\\ \text{0.1 lines/mm between the exposed}\\ \text{part and the non-exposed part}\end{array}} \times 100$$

EXAMPLE 1

The paper used was composed of 100% LBKP (Laubholz Bleach Kraft Pulp) having an basis weight of 175 g/m$^2$ and a thickness of 180. Polyethylene having a density of 0.920 g/cc and a melt index of 5.0 g/10 minutes was applied to the paper by extrusion coating so as to have a thickness of 30μ. The polyethylene had the following compositions (A) to (H). In the following compositions (A) to (H), the compositions (A) to (C), (G) and (H) show comparison and the compositions (D) to (F) show example of the present invention.

(A) A paper to which was added an anatase type titanium oxide as the only pigment.

(B) A paper to which was added an anatase type titanium oxide pigment and calcium stearate as a dispersing agent.

(C) A paper to which was added an anatase type titanium oxide pigment and zinc stearate as a dispersing agent.

(D) A paper to which was added an anatase type titanium oxide pigment which was prepared by dipping the pigment in a solution of 2,4-dihydroxy-2-methylpentane in ethanol, evaporating the ethanol and drying to coat the surface of the pigment particles with 2,4-dihydroxy-2-methylpentane.

(E) A paper to which was added an anatase type titanium oxide pigment coated with trimethylolpropane which was prepared by mixing trimethylol propane and an anatase type titanium oxide pigment and powdering by a jet mill.

(F) A paper to which was added an anatase type titanium oxide pigment coated with trimethylolethane which was prepared by mixing trimethylolethane and an anatase type titanium oxide pigment and powdering by a jet mill.

(G) A paper to which was added an anatase type titanium oxide pigment coated with butanol which was prepared by mixing butanol and an anatase type titanium oxide pigment and powdering by a jet mill.

(H) A paper to which was added as anatase type titanium oxide pigment coated with glucose which was prepared by mixing glucose and an anatase type titanium oxide pigment and powdering by a jet mill.

The titanium oxide pigments were added in an amount of 10% by weight based on polyethylene, respectively.

After the surface of the resulting polyethylene resin coated paper was subjected to a corona discharge treatment, a silver halide photographic emulsion was applied thereto. A minute line chart for measuring a resolving power was printed out thereon, and the resolving power was measured.

Results are shown in Table 1.

TABLE 1

| Experiment No. | Composition of Polyethylene | | Surface Active Agent or Polyhydric Alcohol | Amount Added or Amount Applied (Based on Titanium Oxide Pigment, % by Weight) | Resolving Power (%) |
|---|---|---|---|---|---|
| 1 | (A) | | None | 0 | 47.5 |
| 2 | (B) | | Calcium Stearate | 0.02 | 48.0 |
| 3 | " | | " | 0.5 | 50.4 |
| 4 | " | | " | 1.5 | 50.8 |
| 5 | (C) | | Zinc Stearate | 0.02 | 48.5 |
| 6 | " | | " | 0.5 | 50.5 |
| 7 | " | | " | 1.5 | 50.8 |
| 8 | (D) | (This Invention) | 2,4-Dihydroxy-2-methyl-pentane | 0.02 | 52.0 |
| 9 | " | " | 2,4-Dihydroxy-2-methyl-pentane | 0.5 | 53.5 |
| 10 | " | " | 2,4-Dihydroxy-2-methyl-pentane | 1.5 | 53.6 |
| 11 | (E) | " | Trimethylolpropane | 0.02 | 52.5 |
| 12 | " | " | " | 0.5 | 53.8 |
| 13 | " | " | " | 1.5 | 53.9 |
| 14 | (F) | " | Trimethylolthane | 0.02 | 53.5 |
| 15 | " | " | " | 0.5 | 55.9 |
| 16 | " | " | " | 1.5 | 56.0 |
| 17 | (G) | | Butanol | 0.02 | 47.6 |
| 18 | " | | " | 0.5 | 47.7 |
| 19 | " | | " | 1.5 | 47.7 |
| 20 | (H) | | Glucose | 0.02 | 48.5 |
| 21 | " | | " | 0.5 | 49.5 |
| 22 | " | | " | 1.5 | 49.8 |

EXAMPLE 2

Masterbatches of the composition (A), (C) and (F) in Example 1 were produced by means of a kneader (pressure kneader TD3-5 produced by Toshin Sangyo Co.). Titanium oxide pigment was added to each masterbatch in an amount of 40% by weight based on polyethylene and amounts of zinc stearate and trimethylolethane added or applied were 0.5% by weight, based on the titanium oxide pigment, respectively. Thereafter, the masterbatches were diluted so that the amount of the titanium oxide pigment was 10% by weight based on polyethylene. The masterbatches were then applied to a base paper composed of LBKP 100% having an areal weight of 175 $g/m^2$ and a thickness of 180μ by extrusion coating. The thickness of the polyethylene layer was 30μ. The polyethylene used had a density of 0.920 g/cc and a melt index of 5.0 g/10 minutes.

After the surface of the resulting polyethylene resin coated paper was subjected to a corona discharge processing, a silver halide photographic emulsion was applied thereto and the resolving power was measured. Results are as shown in Table 2. The results clearly show that a high resolving power is obtained when using titanium oxide pigment coated with trimethylolethane, even if it is only mixed for a short time by the kneader.

TABLE 2

| Composition of Polyethylene | Surface Active Agent or Polyhydric Alcohol | Resolving Power (%) Mixing Time in Kneader 15 Minutes | 30 Minutes | 60 Minutes |
|---|---|---|---|---|
| (A) | None | 30.5 | 38.5 | 47.5 |
| (C) | Zinc Stearate | 35.0 | 42.3 | 50.5 |
| (F) | Trimethylolethane | 45.0 | 54.3 | 55.9 |

While the invention has been described in detail and with reference to specific embodiment thereof, it will be apparent to one skilled in the art that various changes and modifications can be made therein without departing from the spirit and scope thereof.

What is claimed is:

1. A photographic printing paper, comprising:
a base paper sheet; and
a coating on said base paper sheet, wherein said coating is comprised of a polyolefin resin containing particles of titanium oxide pigment wherein surfaces of said particles are coated with a polyhydric alcohol selected from the group consisting of dihydric alcohols, trihydric alcohols, or tetrahydric alcohols.

2. A photographic printing paper as claimed in claim 1, wherein said polyhydric alcohols contain from 2 to 18 carbon atoms in a molecule.

3. A photographic paper as claimed in claim 1, wherein said polyhydric alcohols contain from 2 to 4 methylol groups and from 2 to 6 carbon atoms in a molecule.

4. A photographic paper as claimed in claim 1, wherein said polyhydric alcohols contain 3 methylol groups and from 4 to 5 carbon atoms in a molecule.

5. A photographic paper as claimed in any of claim 1, 2, 3 or 4, wherein said polyhydric alcohol is contained in an amount of 0.01 to 10% by weight based on the weight of said titanium oxide pigment.

6. A photographic paper as claimed in any of claim 1, 2, 3 or 4 wherein said polyhydric alcohol is contained in an amount of 0.1 to 1.5% by weight based on the weight of said polyolefin resin.

7. A photographic paper as claimed in any of claim 1, 2, 3 or 4, wherein said titanium oxide is contained in an amount of 1 to 40% by weight based on the weight of said polyolefin resin.

8. A photographic paper as claimed in claim 1, 2, 3 or 4, wherein said titanium oxide is contained in an amount of 5 to 20% by weight based on the weight of said polyolefin resin.

9. A photographic paper as claimed in claim 8, wherein said coating has a thickness of about 5 to 200μ.

* * * * *